July 21, 1925.
J. OPPMAN
LICENSE CARD HOLDER
Filed Sept. 23, 1924
1,546,992
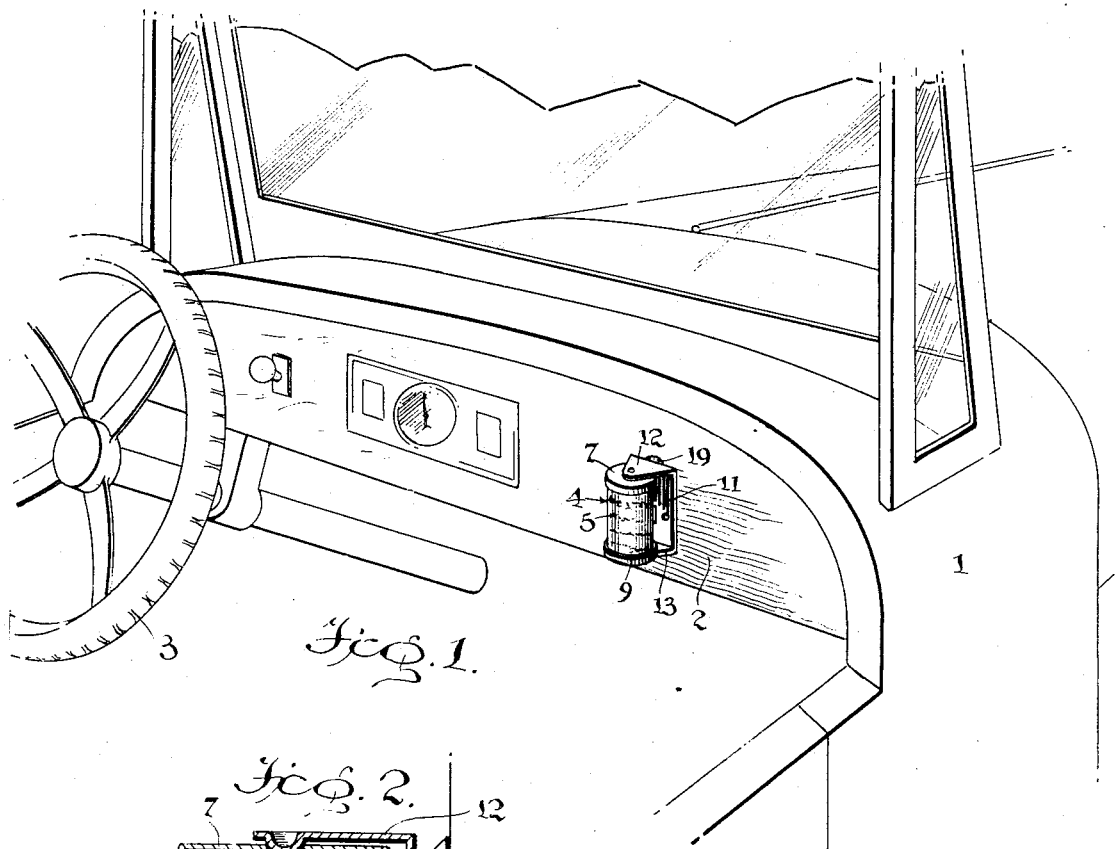
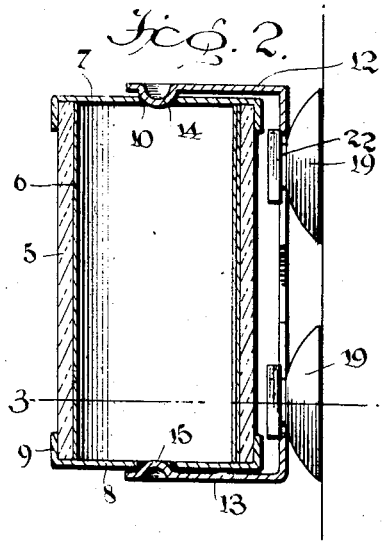
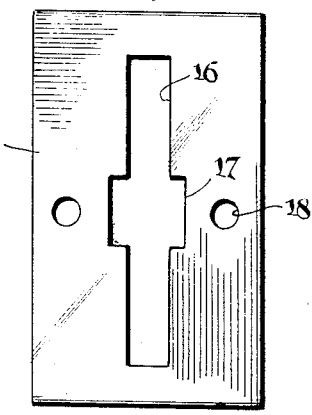
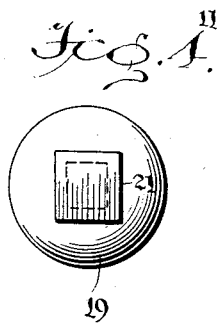
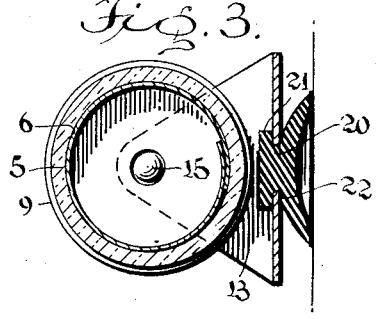
INVENTOR.
J. Oppman,
Geo. F. Kimmel
ATTORNEY.

Patented July 21, 1925.

1,546,992

UNITED STATES PATENT OFFICE.

JOSEPH OPPMAN, OF CONNELLSVILLE, PENNSYLVANIA, ASSIGNOR TO C. S. SANTMYER, OF CONNELLSVILLE, PENNSYLVANIA.

LICENSE-CARD HOLDER.

Application filed September 23, 1924. Serial No. 739,373.

*To all whom it may concern:*

Be it known that I, JOSEPH OPPMAN, a citizen of the United States, residing at Connellsville, in the county of Fayette and State of Pennsylvania, have invented certain new and useful Improvements in License-Card Holders, of which the following is a specification.

This invention relates to a holder for holding motor vehicle operators' licenses which are required by certain States to be carried in the vehicle, but it is to be understood that a holder in accordance with this invention can be employed for any purposes for which it is found applicable, and is designed primarily as an improvement on the construction of holder for the same purpose as set forth in Letters Patent #1,429,091, granted to me September 12, 1922, and besides possessing the objects and advantages as embodied in said Letters Patent, has for a further object to provide in a manner as hereinafter set forth, a holder for the purpose referred to, including a suspension means for detachably securing the holder with the dash board of the vehicle or other suitable point, and further including what may be termed a container for the license and which is detachably connected with the suspension means so that the carrier can be conveniently removed from and connected to the suspension means when occasion so requires.

Further objects of the invention are to provide a holder for the purpose set forth and in a manner as hereinafter referred to, which is simple in its construction and arrangement, strong, compact, efficient in its use, conveniently connected to the vehicle without marring or damaging any portion of the body of the vehicle, and inexpensive to manufacture.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 1 is a fragmentary view, in perspective, of a portion of a motor vehicle showing the adaptation therewith of a license holder in accordance with this invention.

Figure 2 is a vertical sectional view of a license holder in accordance with this invention.

Figure 3 is a section on line 3—3, Figure 2.

Figure 4 is an elevation of one of the suction attaching elements.

Figure 5 is a rear elevation of the suspension plate.

Referring to the drawings in detail, 1 denotes a motor vehicle, 2 the instrument board thereof and 3 the steering wheel. By way of example, the license holder which is referred to generally by the reference character 4, is shown detachably connected to the instrument board.

A license holder in accordance with this invention comprises a carrier, a suspension element or plate therefor, and a plurality of vacuum cups constituting suction attaching elements for detachably connecting the holder with the motor vehicle.

The carrier consists of a hollow cylindrical body portion 5 formed of transparent material, such as glass or celluloid, and which provides what may be termed a container for the reception of the license 6. The body portion 5 is provided at each end with a removable flanged cap member so that convenient access can be had thereto and which are indicated at 7, 8. The cap members are circular in contour and the flange of each of said members is indicated at 9. The cap member 7, as well as the cap member 8, centrally thereof is provided with an opening 10.

The suspension element or plate is constructed from a strip of suitable metallic material and which is set up to provide a body portion 11 and a pair of resilient combined suspending and connecting arms 12, 13, which extend at right angles with respect to the termini of the body portion 11. Each of the said arms is triangular in contour and near the apex thereof is offset inwardly to provide the arm 12 with a downwardly extending hollow semi-spherical lug 14, and the arm 13 with an upwardly extending hollow semi-spherical lug 15. The lugs 14, 15 are adapted to extend into and frictionally engage the walls of the openings 10 for the purpose of detachably connecting the carrier with the suspension element whereby the latter will not only suspend the carrier at the desired point, but furthermore, the carrier when occasion so requires can be quickly disconnected from and connected with the suspension element when occasion requires.

The body portion 11 is rectangular in contour and has the longitudinal center thereof formed with a substantially elongated rectangular slot 16, having each side wall, centrally thereof, cut away, as at 17, so as to provide the intermediate portion of the slot 16 of greater width than the end portions thereof. At each side of the central portion of the slot 16, the body portion 11 is provided with an opening 18 for the passage of a holdfast device if required at any time to secure the suspension element in position.

The means for detachably connecting the suspension element with the vehicle body consists of a plurality of vacuum cups, forming what may be termed suction attaching elements, and each of said cups adjustable relatively to each other consists of a hollow semi-spherical body portion 19 formed on its outer side with a polygonal-shaped neck 20 which terminates in a polygonal-shaped head 21 of greater area than the neck 20, thereby providing a continuous recess 22 between the head 21 and the body portion 20. Each of the cups is formed of resilient material and the neck 20 of each cup is of such size as to snugly engage the side walls of the reduced portion of the slot 16 so that when the suction attaching elements are mounted in position the heads 21 will overlap the body portion 11, as shown in Figure 2. The central portion of the slot 16, is of a size to permit of the passage of the head 21, and after the head 21 has been passed through the central portion of the slot 16, the cup is shifted towards the upper end or towards the lower end of the slot 16 whereby the vacuum cups will be connected with the suspension elements. The size of the neck 20 of the cup with respect to the width of the outer portions of the slot 16, is such as to set up a binding action between the neck and the side walls of the slot 16 so as to prevent the accidental shifting of the suspension element on the necks 20.

The suction attaching elements detachably connect the holder with the vehicle body so that when desired the holder can be removed therefrom. The resilient arms 12 and 13 detachably connect the carrier with the suspension element so that when desired the carrier can be disconnected therefrom without necessitating the disconnecting of the suspension element from the vehicle body.

From the foregoing description taken in connection with the accompanying drawings, a license holder is set up which can be detachably secured to any suitable point of the vehicle body and it further embodies means so that access can be had to the license in a convenient manner when occasion so requires, and although the preferred embodiment of the invention is as illustrated and described, yet it is to be understood that changes in the details of construction can be had which will fall within the light of the invention as claimed.

What I claim is:—

1. A license holder comprising a carrier including a hollow transparent body portion provided with a cap member at each end formed with an opening, a rectangular, flat, slotted suspension element formed with a pair of combined suspending and connecting arms each inset to provide a lug extending into and frictionally engaging the wall of one of said openings for detachably connecting the carrier to said element, and a plurality of vacuum cups mounted intermediate their ends in the slot of said element and further abutting against the inner and outer faces of said element and providing means for detachably connecting said element to a support.

2. A license holder comprising a carrier including a hollow transparent body portion provided with a cap member at each end formed with an opening, a rectangular, flat, slotted suspension element formed with a pair of combined suspending and connecting arms each inset to provide a lug extending into and frictionally engaging the wall of one of said openings for detachably connecting the carrier to said element, and a plurality of vacuum cups mounted intermediate their ends in the slot of said element and further abutting against the inner and outer faces of said element and providing means for detachably connecting said element to a support, the slot of said element having a part thereof of greater width than the remaining part to provide for the positioning of said cups in the narrow part of said slot.

3. A license holder comprising a carrier including a hollow transparent body portion provided with a removable cap member at each end formed with a circular opening, a rectangular, flat suspension element formed with a pair of opposed combined suspending and connecting arms each inset to provide a semi-spherical lug extending in and frictionally engaging the wall of one of said openings for detachably connecting the carrier to said element and further for maintaining the caps spaced from said arms, and a plurality of vacuum cups detachably mounted in and frictionally engaging said suspension element and providing means for detachably connecting said element to a support.

4. A license holder comprising a carrier including a hollow transparent body portion provided with a removable cap member at each end formed with a circular opening, a rectangular, flat suspension element formed with a pair of opposed combined suspending and connecting arms each inset to provide a semi-spherical lug extending in and seating against the wall of one of said openings for detachably connecting the caps spaced from said arms, and a plurality of vacuum cups detachably mounted in said suspension element and providing means for detachably connecting said element to a support, each of said vacuum cups including a body portion and a head spaced therefrom, the said body portions of the cups abutting against one face and the said heads abutting against the other face of said element.

5. A license holder comprising a carrier including a hollow transparent body portion provided with a removable cap member at each end formed with a circular opening, a rectangular, flat suspension element formed with a pair of opposed combined suspending and connecting arms each inset to provide a semi-spherical lug extending in and seating against the wall of one of said openings for detachably connecting the carrier with the suspension element and further for maintaining the caps spaced from said arms, a plurality of vacuum cups removably mounted in and frictionally engaging with said suspension element and providing means for detachably connecting said element to a support, each of said vacuum cups including a body portion and a head spaced therefrom, the said body portions of the cups abutting against one face and the said heads abutting against the other face of said element, and said element provided with means to permit of removably mounting said cups therein.

6. A license holder comprising a carrier including a hollow transparent body portion provided with a removable cap member at each end formed with a circular opening, a rectangular, flat suspension element formed with a pair of opposed combined suspending and connecting arms each inset to provide a semi-spherical lug extending in and seating against the wall of one of said openings for detachably connecting the carrier with the suspension element and further for maintaining the caps spaced from said arms, and a plurality of vacuum cups removably mounted in and frictionally engaging with said suspension element and providing means for detachably connecting said element to a support, each of said arms being of triangular contour and having its inset portion in proximity to the free end thereof.

7. A license holder comprising a carrier including a hollow transparent body portion closed at each end by a removable cap member formed with an opening, a suspension element formed with a pair of combined suspending and connecting arms, said arms provided with means extending into and seating against the walls of said openings for detachably connecting the carrier to said element and further for permanently spacing the caps from said arms, and means for connecting said element to a support therefor.

8. A license holder comprising a carrier including a hollow transparent body portion closed at each end by a removable cap member formed with an opening, a suspension element formed with a pair of combined suspending and connecting arms, said arms provided with means extending into and seating against the walls of said openings for detachably connecting the carrier to said element and further for permanently spacing the caps from said arms, and resilient suction members for detachably connecting said element to support each of said members including a body portion, a neck and a head, said necks seated in and frictionally engaging with said element, and said heads arranged forwardly and said body portions rearwardly of said element.

9. A license holder comprising a carrier including a hollow transparent body portion closed at each end by a removable cap member formed with an opening, a slotted suspension element having a pair of opposed arms frictionally engaging with said members for removably connecting the carrier to said element, and a plurality of suction members extended through the slot of and further opposing both faces of said element, said members adjustable relatively to each other when mounted in said element.

In testimony whereof, I affix my signature hereto.

JOSEPH OPPMAN.